Nov. 12, 1957  H. J. SIERADZKI  2,812,896
COMBINATION FAN AND VALVE CONSTRUCTION
Filed July 7, 1955  2 Sheets-Sheet 1
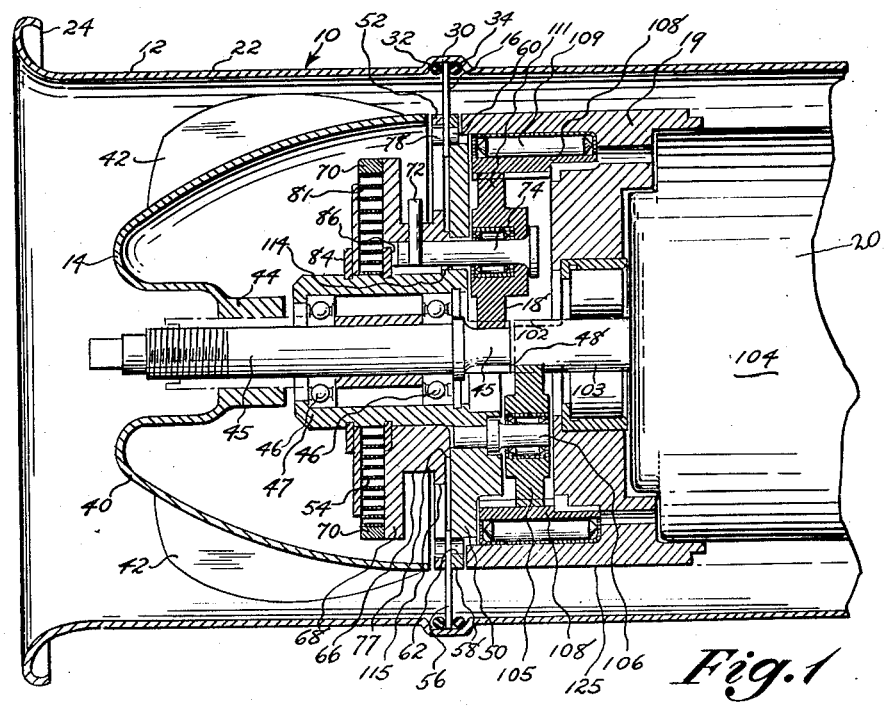
Fig.1
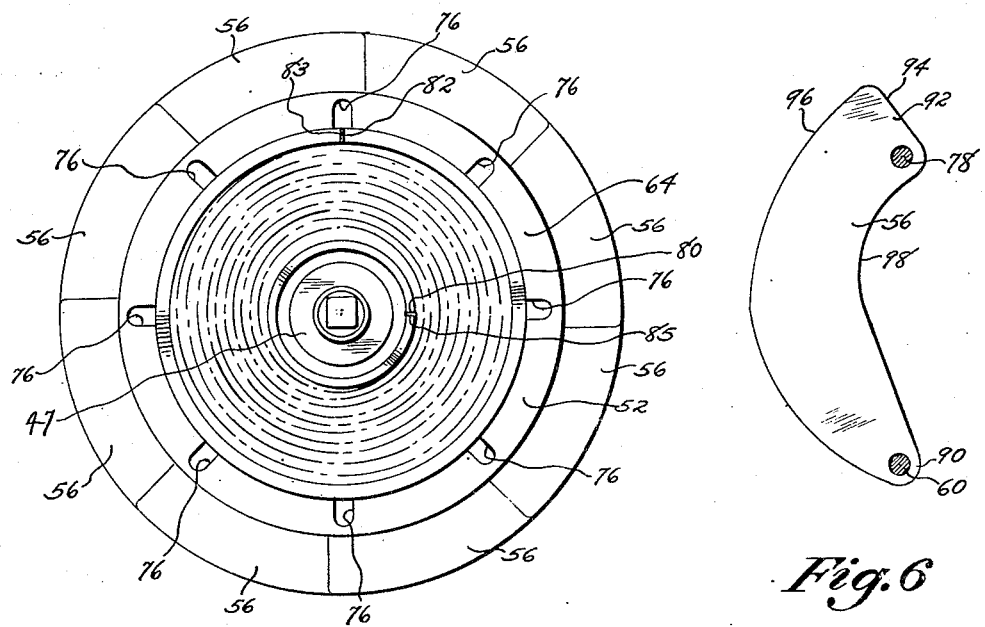
Fig.5
Fig.6

Nov. 12, 1957     H. J. SIERADZKI     2,812,896
COMBINATION FAN AND VALVE CONSTRUCTION
Filed July 7, 1955     2 Sheets-Sheet 2

United States Patent Office 2,812,896
Patented Nov. 12, 1957

2,812,896

COMBINATION FAN AND VALVE CONSTRUCTION

Henry J. Sieradzki, Garden City, N. Y., assignor to Lundy Manufacturing Corporation, Long Island City, N. Y., a corporation of New York Application July 7, 1955, Serial No. 520,547

3 Claims. (Cl. 230—114)

This invention relates generally to the field of ventilation equipment, and more particularly to an improved cooling fan device adapted to be disposed entirely within a ventilating duct and having an integral valve shut-off.

In certain applications, particularly in the aircraft industry, limitations of weight and over-all size make essential the eliminaton of as many switches and other control components as possible in devices of this type, while yet maintaining proper function.

In prior art constructions, it has been necessary to employ separate controls for fan and valve with the accompanying difficulty of synchronizing the same so that the valve will open at the time the fan begins to operate, and close when the operation of the fan is interrupted.

It is therefore among the principal objects of the present invention to provide a combination fan and valve construction which will automatically perform the above mentioned function when a prime mover driving the fan component is energized.

Another object of the invention lies in the provision of combination fan and valve construction which is adapted to be disposed entirely within a ventilating duct, thereby occupying a minimum of space in proportion to the volume of air moved.

A further object of the invention lies in the provision of an internally contained diaphragm valve construction in which the closing motion for arresting the flow of air through a duct involves the moving of a plurality of blades to an expanded condition wherein the internal surface of the duct is contacted, and in which in an opened position, the blades are contracted radially to the center of the duct thus leaving a relatively large peripheral area within the duct through which air may flow.

Still another object of the invention lies in the provision of resilient means for closing the valve structure which is adapted to be overcome by normal starting torque of the fan component, and which resiliently closes the valve when the annular velocity of the fan drops below a predetermined point.

A feature of the invention lies in the relatively few number of parts employed in the device, thus permitting relatively low manufacturing costs with consequent wide sale, distribution and use.

Another feature of the invention lies in the compact arrangement of the component parts, thus permitting simplified installation in a variety of applications having severe space limitations.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1 is a fragmentary longitudinal central sectional view of an embodiment of the invention.

Figure 5 is a view in elevation of the valve element, corresponding to that seen on Figure 3, with the valve spring cover member removed in entirety.

Figure 6 is a view in elevation of one of the valve blades.

Figure 2:
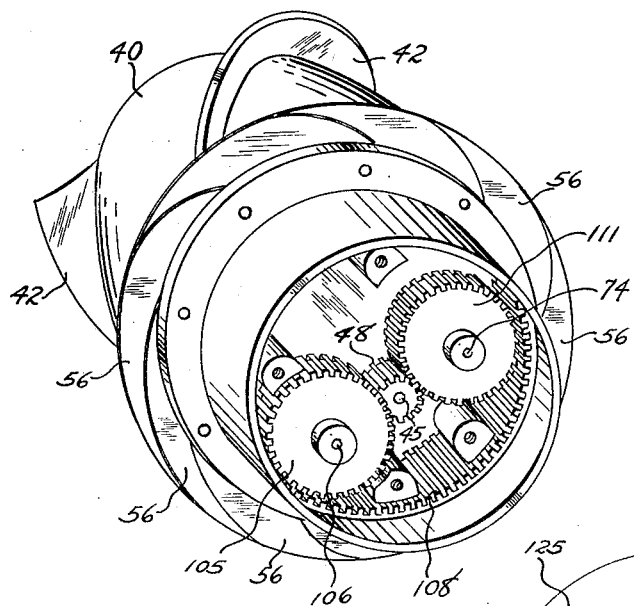
Figure 2 is a view in perspective of the fan and valve elements which comprise parts of the embodiment as seen from the right-hand portion of Figure 1.
Figure 4:
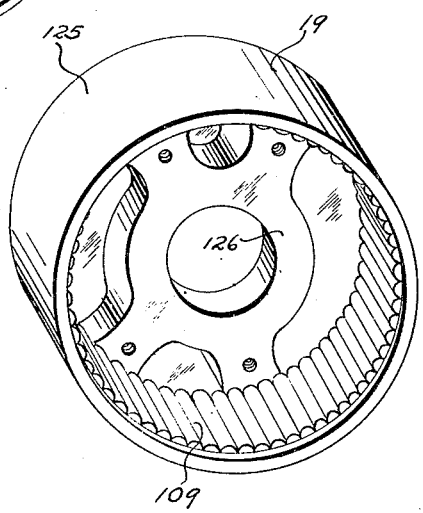
Figure 4 is a view in perspective of the prime mover support housing, as seen from the right-hand portion of Figure 1.

In accordance with the invention, the device, generally indicated by reference character 10, comprises broadly: a duct element 12, a fan element 14, a valve element 16, a gear train element 18, mounting means 19 and a prime mover 20. The bulk of the above elements is preferably made of aluminum alloy, although magnesium alloys are also suitable in the interest of maintaining relatively low weight.

The duct element 12 is of tubular construction including a main body portion 22, a flared lip portion 24, and an inner edge portion, not shown, adapted to engage a ventilating duct (not shown), the details of which form no part of the present invention or disclosure. A radially extending recess 30 is fitted with resilient sealing means 32 and 34 between which the valve element 16 may move to effectively seal the duct as required.

The fan element 14 includes a relatively large boss member 40 which serves to guide incoming air to the internal periphery of the duct element 12, and is provided with a plurality of blades 42 adapted to propel the air in a rightward direction, as seen on Figure 1. The hub member 44 is mounted upon a driving shaft 45 which is in turn supported on bearings 46, for rotation about a substantially horizontal axis. At the inner end of the driving shaft 45 is a pinion 48 through which rotational motion is transmitted during operation.

The valve element 16 is of an iris diaphragm type, but differs from conventional constructions in that the individual blades expand outwardly upon closing. The element 16 includes a flange member 50, a valve actuating ring 52, a valve closing spring 54, and a plurality of planar blade members 56 arranged in overlapping fashion, as best seen on Figures 2, 3 and 5.

The flange member 50 is preferably formed integrally with the housing 47, and is bolted by means not shown to the element 19, which is in turn attached to the prime mover 20, the principal source of support of the device 10 within the duct. It includes an outer peripheral edge 58, which with the means 32—34, determine the effective flow area of the valve element when in an open condition. A plurality of blade mounting pins 60 are arranged at equally spaced intervals adjacent the edge 58 within holes 62. The blade members 56, in opening and closing, pivot upon the relatively fixed pins 60.

Figure 3:
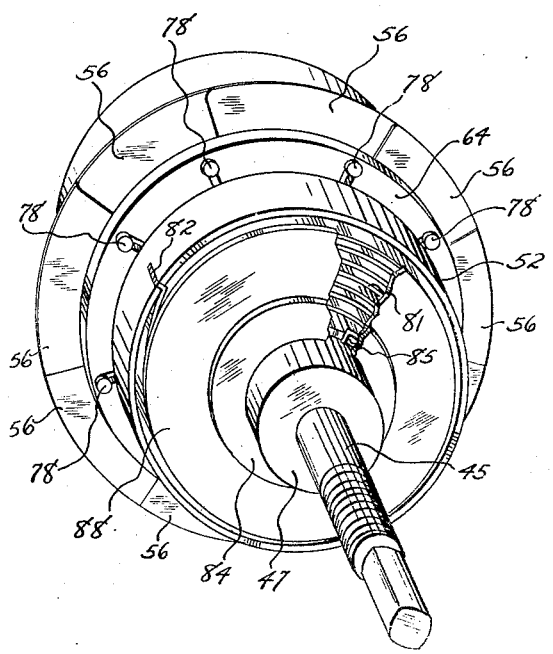
Figure 3 is a view in perspective, partially broken away to show detail of the valve element which comprises a part of the embodiment, as seen from the left-hand portion of Figure 1.

The valve actuating ring 52 is best seen on Figures 1, 3 and 5, and includes an inner flange member 64, a cylindrical member 66, and an outer flange member 68. A cylindrically shaped spring retainer member 70 extends in an outwardly direction from the periphery of the outer flange member 68 to form a recess in which the spring 54 may be maintained. Pin means 72 interconnects the cylindrical member 66 with the shaft 74, which forms a part of the gear train element 18, as will become more clearly apparent at a point later in the disclosure. A plurality of radially arranged blade pin slots 76 are spaced at substantially equal intervals in the inner flange member 64, and are engaged by blade pins 78 mounted on the movable ends of the blades 56. A flange 77 provides spacing means between the inner flange member 64 and the flange 50, thereby forming an annular groove into which the blades 56 may be moved when in a retracted position, i. e. when the valve element 16 is opened.

The valve closing spring 54 is of a clock-type, including a plurality of convolutions 81 all lying substantially within a plane. The outer end 82 is attached to the member 70 by any suitable means, such as the slot 83, while the inner end 80 is secured in the slot 85 to the housing 47. Snap ring members 84 and 86 maintain the spring 54 and spring cover 88 in the position shown on Figure 1, the cover 88 preventing disalignment of the spring convolutions 81 disposed therebeneath.

The individual blades 56 are all generally similar, the configuration of the same being best seen on Figures 2 and 6. Each blade includes a relatively fixed end 90 engaged by a pin 69 and a movable end 92 engaged by a pin 78. The movable end is bounded by a substantially rectilinear edge 94, an outer arcuate edge 96, the curvature of which corresponds substantially to that of the inner surface of the duct element 12, and an inner arcuate edge 98, the curvature of which corresponds substantially to the periphery of the flange 77.

The gear train element 18 includes an input gear 102 on the armature shaft 103 of the motor 104, which gear meshes with a first driven gear 105 mounted for rotation about a shaft 106, the shaft 106 being anchored on the housing 47. Motion is transmitted through the gear 105 to an internal ring gear 108, which rides on needle bearings 109, within the mounting means 19. The ring gear 108 meshes with gear 111 on shaft 74, and motion is transmitted through this gear to the pinion 48 on shaft 45. An arcuate slot 114 permits the shaft 74 to move in an arcuate path about an axis through the driving shaft 45 with respect to the housing 47, thereby shifting the position of the actuating ring 52.

The mounting means 19 includes an outer cylindrical flange 125 and a web member 126 which provides structure for the mounting of the device upon the prime mover 20, which as has been mentioned, includes an electric motor 104.

Upon the commencement of operation by energizing the driving motor 104, torque is transmitted through the shaft 103 and the gear train element 18. Due to the inertia of the fan, the first surge of initial torque causes the gear 111 to roll as a planetary gear about the pinion 48, the shaft 74 serving to rotate the actuating ring 52 wherein the blades 56 are moved from closed to opened position. This motion simultaneously winds the spring 54, and is arrested upon the pins 78 reaching the inner ends of the slots 76, indicated by reference character 115. At this point, the gear 111 begins to rotate about its own axis, and transmitted motion results in rotating the fan element 14.

Upon interruption of current to the motor 104, the torque transmitted through the drive shaft 103 eventually reaches a point where it is insufficient to maintain the spring 54 in the stressed condition, and the same acts to close the valve element 16 by returning the blades 56 to the position shown on Figures 1, 2, 3 and 5. The gear train element 18 is preferably adapted to provide at least 300 percent excess torque, including the torque required to overcome the spring 54, based upon the power absorption of the fan element, to assure efficient operation.

It may thus be seen that I have invented novel and highly useful improvements in combination fan and valve construction, in which the necessity for separate controls has been eliminated, and the control elements required reduced to a minimum of a single electric switch. The combination unit is both compact in over-all dimensions and light in weight, thus ideally suiting the same to be disposed completely within a substantially cylindrically shaped duct from which it may be easily removed as required for servicing or replacement. The number of moving parts employed, including the gear train, are relatively low in number, and are so positioned as to be completely shielded from inrushing air disposed within the duct.

I wish it to be understood that I do not consider the invention limited to the exact details of structure shown and set forth in this specification, for obvious modifications will occur to those skilled in the art to which the present invention pertains.

I claim:

1. Combination fan, valve and duct structure comprising: a cylindrical duct, a fan element and a valve element substantially centrally disposed within said duct; said valve element including a plurality of movable blades having first and second positions, said blades in the first expanded position thereof acting to contact the inner surface of said duct to completely seal the same, and in the second contracted position thereof to lie in disengaged position with respect to said duct to define an annular opening within said duct through which a fluid may pass; and means for opening said valve upon the starting of said fan and closing said valve upon the dropping in angular velocity of said fan below a predetermined limit; said last-mentioned means including a valve actuating flange, a gear mounted for rotation upon said valve actuating flange, and shiftable orbitally with said flange upon rotational movement of said flange about the axis of rotation of said fan element.

2. Combination fan, valve and duct structure comprising: a cylindrical duct, a fan element and a valve element substantially centrally disposed within said duct; said valve element including a plurality of movable blades having first and second positions, said blades in the first expanded position thereof acting to contact the inner surface of said duct to completely seal the same, and in the second contracted position thereof to lie in disengaged position with respect to said duct to define an annular opening within said duct through which a fluid may pass; and means for opening said valve upon the starting of said fan and closing said valve upon the dropping in angular velocity of said fan below a predetermined limit; said last-mentioned means including a valve actuating flange having a centrally disposed axis of rotation, a gear mounted for rotation upon said flange about an axis laterally disposed with respect to said first-mentioned axis, and an internal ring gear concentrically disposed with respect to said first-mentioned axis and meshing with said first-mentioned gear.

3. Combination fan, valve and duct structure comprising: a cylindrical duct, a fan element and a valve element substantially centrally disposed within said duct; said valve element including a plurality of movable blades having first and second positions, said blades in the first expanded position thereof acting to contact the inner surface of said duct completely seal the same, and in the second contracted position thereof to lie in disengaged position with respect to said duct to define an annular opening within said duct through which a fluid may pass; and means for opening said valve upon the starting of said fan and closing of said valve upon the dropping in angular velocity of said fan below a predetermined limit; said last mentioned means including a valve actuating flange having a centrally disposed axis of rotation, a gear mounted for rotation upon said flange about an axis laterally disposed with respect to said first mentioned axis, and an internal ring gear concentrically disposed with respect to said first mentioned axis and meshing with said first meshing gear; resilient means interconnecting said valve actuating flange and a relatively fixed portion of said valve tending to urge said valve actuating flange in a direction to close said valve; and prime mover means transmitting a torque through said gears sufficient to overcome said resilient means when activated to drive said fan element.

(References on following page)

References Cited in the file of this patent

UNITED STATES PATENTS

| | | | |
|---|---|---|---|
| 329,567 | Kahl | Nov. 3, | 1885 |
| 745,313 | Bate | Dec. 1, | 1903 |
| 2,393,042 | Hagen | Jan. 15, | 1946 |
| 2,460,778 | Willgoos | Feb. 1, | 1949 |

FOREIGN PATENTS

| | | | |
|---|---|---|---|
| 30,289 | France | Mar. 31, | 1926 |
| | (First addition to No. 600,436) | | |
| 463,657 | Italy | May 21, | 1951 |
| 951,944 | France | Apr. 25, | 1949 |